Figure 9:
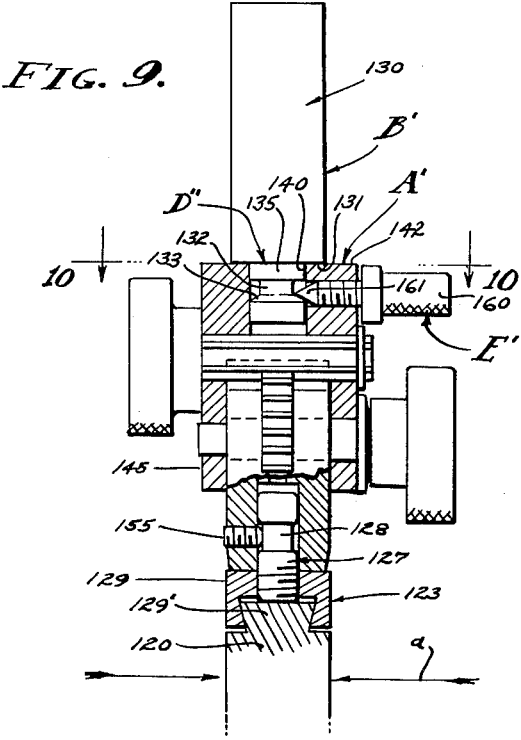

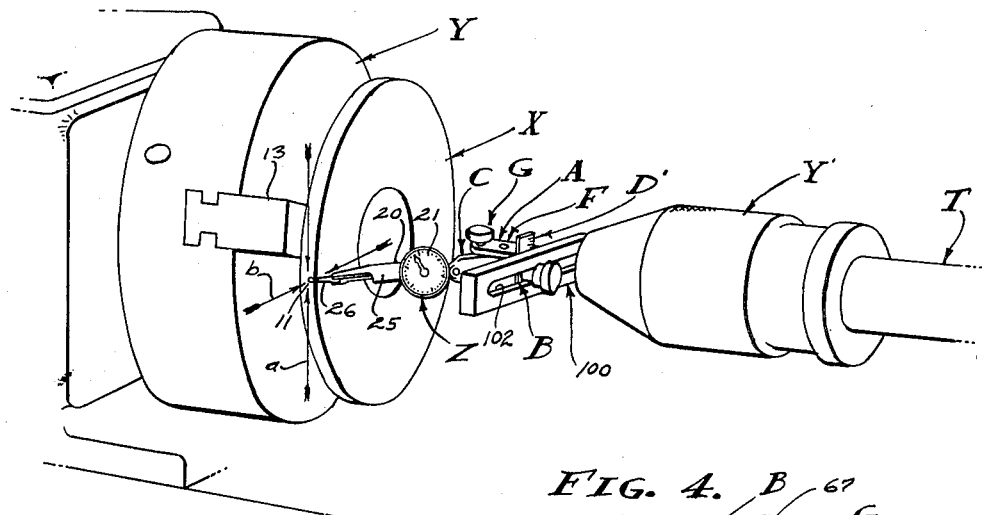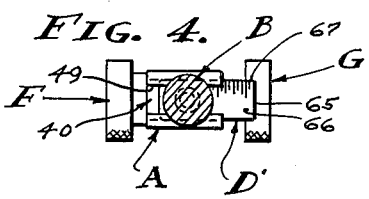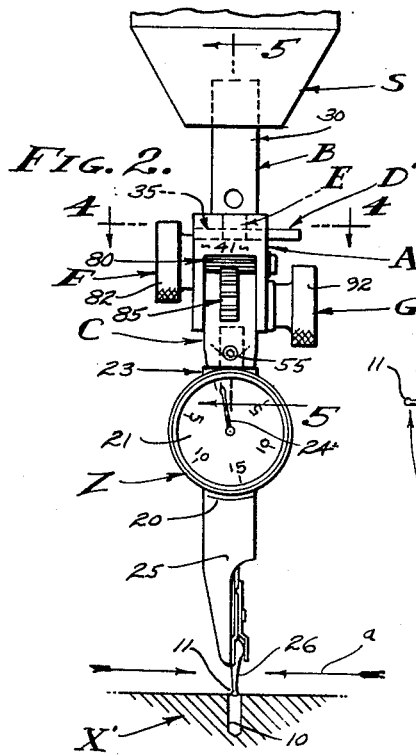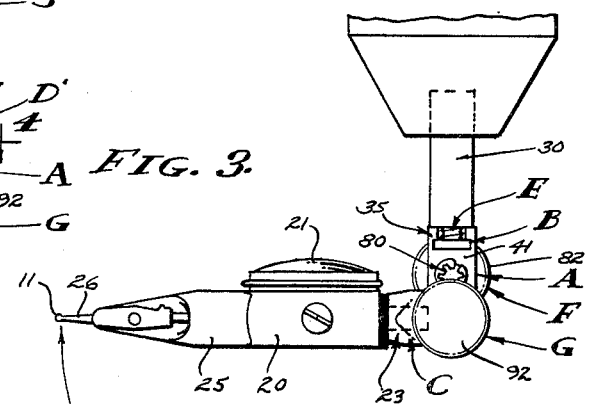

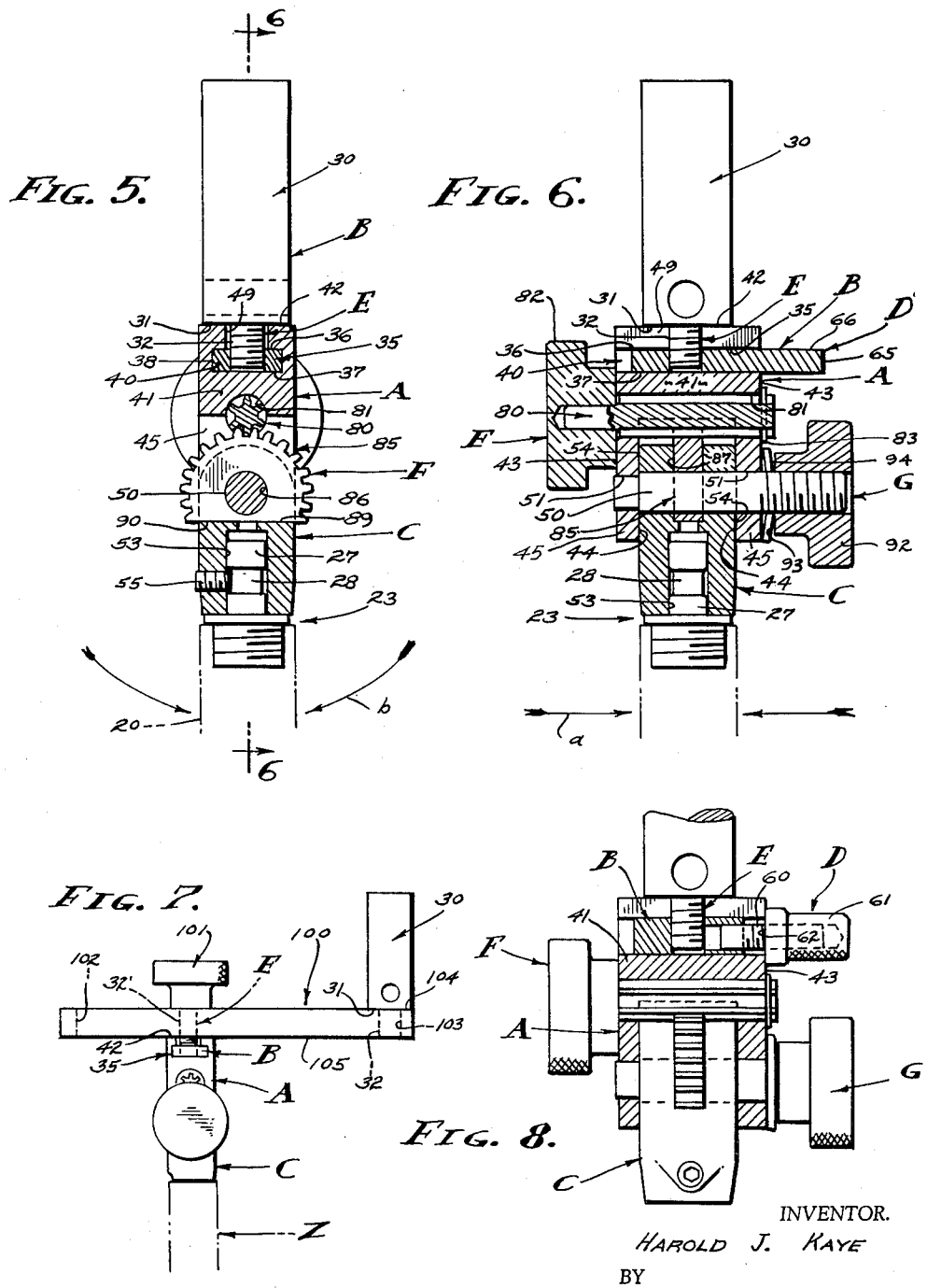

Jan. 30, 1962 H. J. KAYE 3,018,994
ADJUSTING DIAL INDICATOR MOUNTING
Filed Oct. 20, 1958 3 Sheets-Sheet 3

INVENTOR.
HAROLD J. KAYE
BY
Wm. H. Maxwell
AGENT

United States Patent Office 3,018,994
Patented Jan. 30, 1962

3,018,994
ADJUSTING DIAL INDICATOR MOUNTING
Harold J. Kaye, Los Angeles, Calif., assignor to
Robert A. Edgcomb, Burbank, Calif.
Filed Oct. 20, 1958, Ser. No. 768,097
3 Claims. (Cl. 248—278)

This invention relates to a mounting for a dial indicator and is particularly concerned with an adjustable mounting structure for such an instrument, it being a general object of this invention to provide quickly and accurately operable means for positioning a dial gage or indicator in relation to a workpiece and for the purpose of determining the exact position of said workpiece.

The dial gage or indicator is a long known and widely used instrument employed by the machinist for a wide variety of purposes. A dial indicator is used extensively to locate the position of workpieces in machine tools. For example, workpieces are chucked in lathes and in milling machines in which case it is necessary to center the workpiece accurately with the spindle and cutter of the machine. Also, it is commonly necessary to locate the positions of openings, or of walls or flanges, etc. and as well as heights of various objects of machine work.

The dial gage is a form of instrument having a graduated dial and a hand which is connected to a contact-point by a system of multiplying levers, so that a very slight movement of the contact-point is greatly magnified by the indicating hand. This contact-point is placed in contact with the part to be tested, and variations, either in size, alignment, or concentricity, depending upon how the gage is used, are shown by the movements of the hand relative to the dial, which is graduated to read thousandths, or tenthousandths, of an inch. Dial gages are used in combination with many different forms of apparatus and are particularly useful with the apparatus of the present invention, all as hereinafter described.

In order for a dial indicator to be practically employed it must be mounted and to this end indicator mountings involving friction joints, and the like, have been universally used. Said mounting joints that are generally employed usually involve a ball and socket arrangement with a threaded element that is tightened to gain the necessary friction. In order to move the indicator into a working position it is necessary to articulate the joints of the mounting and this movement requires pressure and almost always requires impact forces, at least to some extent. Since exact positioning of a dial indicator is often required, the usual "hit or miss" method of exerting pressure by forcing the joints to move and by tapping and jarring the dial indicator into position is time consuming and not altogether satisfactory. As a matter of fact, the machinist is never positive or sure just where the instrument will be moved to, and must resort to "trial and error" in the process of positioning the instrument.

It is an object of this invention to provide a mounting for a dial indicator that adjustably positions the indicator in a positive predetermined manner whereby the contact-point thereof is brought to an exact position or testing point. With the structure that I have provided the dial indicator instrument is adjustably moved into working position and is not pressured into said position by impact force and by trial and error methods.

It is another object of this invention to provide a mounting for a dial indicator that is adjusted and located in the selected position whereby the contact-point is positively held at an exact position or testing point. With the structure provided the mounting is adjusted after which means are operated to lock the indicator instrument in the selected position.

It is also an object of this invention to provide a mounting that individually adjusts the indicator instrument in two directions in planes of movement at right angles to each other. With the structure provided adjustment of one movement does affect the position effected by the other movement, and vice versa. Therefore, the actions or movements involved are predetermined resulting in positive and exacting placement of the contact point at the selected testing point.

It is still another object of this invention to provide a mounting of the character referred to that is of simple and rugged construction, and which is reliable and easily operated by the machinist for the purpose or process of dial indicating.

Figure 10:
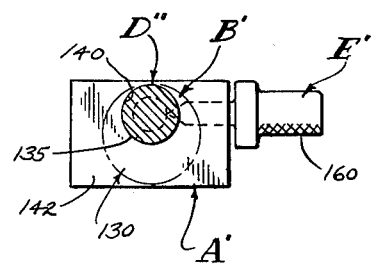
Figure 11:
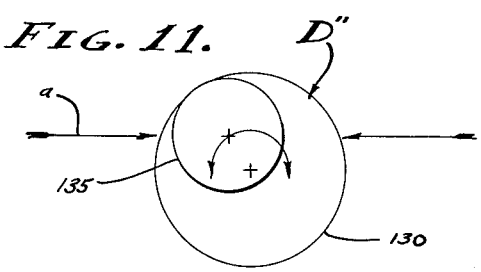

The various objects and features of my invention will be fully understood from the following detailed description of typical preferred forms and applications of my invention, throughout which description references are made to the accompanying drawings, in which:

FIG. 1 is a perspective view showing the application of the dial indicator mounting that I have provided. FIG. 2 is a side elevation of another application of the mounting. FIG. 3 is a side view of the structure shown in FIG. 2 and showing the parts of the mounting moved to place the dial indicator in a different position. FIG. 4 is a sectional view taken as indicated by line 4—4 on FIG. 2. FIG. 5 is an enlarged sectional view taken substantially as indicated by line 5—5 on FIG. 2. FIG. 6 is a sectional view taken as indicated by line 6—6 on FIG. 5. FIG. 7 is a side view of the mounting employing parts that are illustrated in FIG. 1 of the drawings. FIG. 8 is a view similar to FIG. 6 and showing a modified form of the invention. FIG. 9 is also a view similar to FIG. 6 and shows a further modification of the invention. FIG. 10 is a sectional view taken as indicated by line 10—10 on FIG. 9, and FIG. 11 is a diagrammatic view illustrating the motion involved in the structure shown in FIGS. 9 and 10.

The adjustable dial indicator mounting of the present invention is useful in any situation requiring movable mounting of this instrument, for example, with height gages, with lathes, with mills, with drill presses, and with jig-bores, etc. In the drawings I have shown, generally, two types of uses of the mounting for dial indicators. In FIG. 1 of the drawings I have shown a lathe and employment of the indicator to center a workpiece X in a chuck Y. In FIG. 2 of the drawings I have shown a drill press or vertical mill and employment of the instrument to center the spindle S with an opening 10 in a workpiece X'. In either case illustrated, it is to be observed that the dial indicator Z is shiftably mounted to move the contact-point 11 in two planes a and b that are normal to each other. The planes of movement are extremely important since, as will be apparent from FIG. 1 of the drawings, exact positioning of the contact-point is at the periphery of the workpiece X and tangent thereto in a plane of motion on a radius line intersecting the central axis of the workpiece. In other words, the contact-point 11 must approach the workpiece X on a plane a radiating from the center of the workpiece,. The above relationship is not too apparent in FIG. 2 of the drawings, however, the same requirements prevail in the arrangement of elements shown in said figure showing the utility of the present invention in connection with the indicating of very small holes or openings 10.

A machine tool is only briefly indicated in FIG. 1 of the drawings and is shown as involving a chuck Y and a tail-stock T. The chuck is adapted to carry the piece of work X and has jaws 13 that are radially shiftably into and out of engagement with the work to grip and hold it concentric with the axis of the machine tool. It is to be understood that the particular tool shown is for purpose of illustration only and that the present invention is adaptable to many situations similar to the particular situation herein disclosed.

The dial gage Z that I have illustrated is of typical construction and involves, generally, a body 20, a dial 21, a contact-point 11 laterally removed from the body, and a support 23. The body 20 carries the dial 21 with a hand 24 that moves relative thereto to show movement of the contact-point 11 relative to the body 20. An extension 25 projects laterally of the body 20 to carry the contact-point 11 which is in the form of a small ball-shaped element at the terminal end of a lever arm 26. The contact-point 11 and lever arm 26 are connected to the hand 24 by a system of multiplying levers (not shown) so that very slight movement of the contact-point is magnified and reflected in a corresponding movement of the hand 24. In accordance with the invention the support 23 involves a stem 27 threaded into the body 20 to project from the end of the body opposite the end thereof that carries the lever arm 26 and contact-point 11. In practice, the stem 27 is grooved at 28 to receive the point of a set screw, later described.

In accordance with the invention, I have provided the adjustable mounting which is adapted to rigidly support the dial gage Z for use in aligning the gage along the two planes of movement a and b. The adjustable mounting is preferably held and supported by the tail-stock T, or by the chuck S of a machine tool as shown in FIG. 2 of the drawings, the tail-stock T being adapted to carry a chuck Y' for gripping the mounting that I provide for adjustably supporting the dial gage Z. As illustrated throughout the drawings, the mounting that I provide involves, generally, a frame A shiftably carried on a base B, a shiftable gage carrier C, means D adjustably positioning the frame A relative to the base B, means E to lock the frame A in position relative to the base B, means F adjustably positioning the carrier C relative to the frame A, and means G to lock the carrier C in position relative to the frame A.

The base B is the foundation of the mounting structure and is adapted to be supported by the chuck Y', or a clamp, as for example, the clamp of a height gage (not shown). As illustrated, the base B involves, generally, a shank 30 and a plate 35. As best illustrated in FIGS. 5 and 6 of the drawings the shank 30 is an elongate cylindrical element that projects vertically from the plate 35 while the plate 35 is a flat horizontally disposed element in a plane normal to the axis of the shank 30. For purposes later described the shank 30 has a smooth flat bottom end 31 normal to the axis of the shank and a stem 32 depends from the shank and is threaded into the plate 35. As shown, the stem 32 is substantially smaller in diameter than the shank 30, and further, the plate 35 is characterized by a flat and smooth parallel top and bottom 36 and 37 and parallel sides 38.

The frame A is shiftably carried by the base B and is a rigid element that depends from the base B to shiftably support the carrier C. As best illustrated in FIGS. 5 and 6 the frame A involves, generally, a guideway 40 and legs 45. The frame A is formed of a rigid body 41 of material with the guideway 40 formed in the upper portion thereof and the legs 45 formed at the lower portion thereof. The body 41 has a flat, smooth top 42, flat parallel ends 43, and the lower portion is bifurcated to form the pair of legs 45 depending at each end 43 and with parallel opposed inner faces 44 that are flat and smooth. The guideway 40 extends horizontally and longitudinally of the body 41 in a plane normal to the vertical axis of the structure and adapted to slidably receive the plate 35 and has, therefore, a smooth, flat parallel top and bottom and sides corresponding to the top and bottom 36 and 37 and sides 38 above described.

However, the top portion 41 is channel-shaped with a slot-shaped opening 49 extending longitudinally of the guideway 40 so that the guideway opens upwardly to receive the stem 32. The opening 49 is substantially narrow so that the top of the guideway 40 faces downwardly at each side thereof.

The shiftable gage carrier C is a movable element and, in accordance with the invention, it pivots or swings from the frame A in a plane extending transverse of the guideway 40. The carrier C is itself a rigid element carried between the opposed faces 44 of the legs on a pivot 50 in the form of a pin that is, in practice, pressed into an opening in the upper portion of the carrier C. The pivot 50 projects from the ends of the carrier C to be rotatably journaled in spaced bearing openings 51 in each of the legs 45, the axis of the pivot 50 and bearings 51 being parallel with and spaced downwardly from the plane of the guideway 40. The carrier C normally depends from the frame A and is provided with a socket 53 to receive the stem of the support 23. When in a normal depending position the axis of the socket 53 is coincidental with the axis of the shank 30 above described. The ends 54 of the carrier C are parallel with each other and slideably engage with the faces 44 of the legs with little or no play, there being clearance enough so that no resistance to movement is encountered. A set screw 55 is threadedly carried in the side of the carrier C to engage in the groove 28 of the stem 27 thereby securing the dial indicator instrument Z to the mounting that I provide.

The means D for adjustably positioning the frame A relative to the base B involves, in its simplest form, the clamping of the base B onto the upper portion of the frame A when the parts have been moved to the desired position, this form of the invention being shown in FIGS. 1 to 7 of the drawings. However, in FIG. 8 of the drawings I have shown means for positively adjusting the frame A relative to the base B and which involves a feed screw 60 operably engaged with one end of the base plate 35 and a head 61 engaged with one end 43 of the body 41. The head 61 cooperates with the screw 60 and is adapted to be manipulated and turned, it being understood that the number of turns, or portions thereof, of the head will determine the positioning of the frame A relative to the base B. In the preferred form of the invention, the screw 60 is in the form of a stud that projects from the plate 35 and the head 61 is threadedly carried on the stud. The head 61 has a flat face 62 opposed to the end 43 of the body and acts to pull in one direction and is manually urged in the other direction. Engagement of the face 62 with the end 43 of the body 41 determines the positioning of the parts.

In FIGS. 1 to 7 of the drawings, where I have shown the simplest form of the invention without the feed screw 60, position indicating means D' is provided in order to show relative positioning of the frame A and base B. The position indicating means D' involves an extension 65 of the base plate 35 and which projects beyond one end 43 of the frame A. The top 66 of the extension 65 is marked with suitable scaled graduations 67 (see FIG. 4) so that positioning of the plate 35 is readily determined. Thus, the frame A can be moved relative to the plate B and positioned by observing the graduations 67 relative to the end 43 of the frame A.

The means E for locking the frame A relative to the base B involves the parts of the elements A and B hereinabove described. As mentioned in connection with the means D, a clamping action is obtained between the parts of said elements, the locking means E involving the plate 35 and guideway 40, as above described. The stem 32 is threadedly engaged in the opening in the plate 35 to the end that turning of the plate 35 relative to the shank 30 causes clamping action between the face 36 of the plate 35 and the top of the guideway 40. In practice, the shank 30 is anchored in a fixed position and the plate 35 is turned by simply revolving the frame A a portion of a turn to either tighten or to loosen the plate 35 in the guideway 40, it being a simple matter to move the frame A and base B relative to each other when the parts are loosened. Either manual shifting and observing of the graduations 67, or revolving of the feed screw 60 results in positioning of the frame A in a plane of movement *b* extending transversely of the axis of the mounting structure.

The means F for adjustably positioning the carrier C relative to the frame A is a drive means involving a drive element 80 and a driven element 85. The drive element 80 is manually operable while the driven element 85 is moved by the element 80 and shifts the carrier C. In the preferred form of the invention the means F is a gear drive, the drive element 80 being a drive pinion and the driven element 85 being a driven gear. As shown, the pinion 80 is rotatably carried by the body 41 on an axis parallel to and spaced between the guideway 40 and the pivot 50, while the driven gear 85 is coupled with the carrier C. As best illustrated in FIGS. 5 and 6 the drive element 80, or pinion, extends longitudinally of the body 41 through a bore 81 that opens between the legs 45 and also at the ends 43 of the body. A drive wheel 82 is carried by the pinion 80 at one end of the body and the pinion projects somewhat from the other end of the body where it is provided with a split-ring retainer 83.

As illustrated in FIGS. 5 and 6, the driven element 85, or driven gear, has a central bore 86 slidably receiving the pivot 50, the gear 85 having flat parallel sides 87. In order to have coupled driving engagement of the gear 85 and carrier C, the upper portion of the carrier is recessed to have opposed walls and a seat 89. As shown in FIG. 5 the gear 85 has a flattened side 90 adapted to seat on the seat 89, while the sides 87 are slidably engaged with the walls of the recess. Thus, when the pivot is engaged through the bore 86, the gear 85 and carrier C are coupled. As indicated, the top of the carrier C is rounded and the periphery of the gear 85 projects radially therefrom to be meshed with the pinion 80. Turning of the driven element 80 results in a geared down shifting of the carrier C, for example, with a ratio of six to one.

The means G for locking the carrier C in the selected position relative to the frame A is a clamping means that is provided to hold the elements as positioned by the means F. As above pointed out, the pivot 50 is pressed into the carrier body and the end portions of the pivot are rotatably carried in the bearing openings 51. As clearly shown in FIG. 6, one end of the pivot 50 projects from the leg 45 through which it is passed and it is threaded to carry a wheel 92. The wheel 92 has an inner clamp face 93 opposed to the outer side of the leg 45, there being a cupped lock washer 94 interposed between the face 93 and leg 45. When the wheel 92 is loosened the means F is free to shift the carrier C, but when the wheel 92 is tightened on the extension of the pivot 50 the carrier itself is gripped in the selected position.

In FIG. 7 of the drawings I have shown a mounting bar 100, as illustrated in use in FIG. 1, said bar being useful to extend the positioning of the dial indicator Z laterally of the axis of the shank 30. The shank 30 and plate 35 remain the same as above described, and the bar 100 is interposed therebetween with the aid of an additional clamp screw 101. The bar 100 is an elongate rectangular cross-sectional element with a slot 102 substantially coextensive therewith and with a threaded opening 103 at one end thereof to receive the stem 32. The shank 30 projects from the top face 104 upon which the bottom face 31 of the shank has clamping engagement. The top 42 of the frame A has flat engagement with the bottom face 105 of the bar 100, and the clamp screw 101 has a stem 32' that depends through the slot 102 to threadedly engage in the plate 35 of the base B. When the screw 101 is tightened the base B is clamped to the bar 100, it being a simple matter to select the desired position along the bar.

In FIGS. 9, 10 and 11 of the drawings I have shown a form of the invention wherein the frame A', base B' and means D'' and E' are of modified construction. In accordance with the invention, as above set forth, the mounting involves a frame A' shiftably carried on a base B', means D'' adjustably positioning the frame A' relative to the base B', and a means E' to lock the frame A' in position relative to the base B'. The carrier C, adjusting means F and lock means G are the same as hereinabove described.

The base B' is essentially the same as the base B and involves, generally, a shank 130 and a stem 135. The shank 130 is an elongate cylindrical element that projects vertically while the stem 135 depends from the flat bottom end 131 on the shank. The end 131 is flat and normal to the axis of the shank and the stem 135 depends therefrom on an axis parallel to and offset laterally of the axis of the shank. Thus, the axis of the stem and of the shank are eccentric relative to each other. The stem 135 is round and is characterized by a groove 132 shaped to cooperate with the lock means E', as later described.

The frame A' is shiftably carried by the base B' and is a rigid element that depends from the base B' and, as shown in FIGS. 9 and 10, it involves, generally a bearing 140, and legs 145. The frame A' has a flat smooth top 142 and the bearing 140 is in the form of a cylindrical opening entering into the frame A' at the top 142. As clearly illustrated, the stem 135 is rotatably engaged in the bearing opening 140 so that the base B' can be turned relative to the frame A', and as shown, the end 131 of the shank is engaged with the tip 142 of the frame A'.

The means D'' for adjustably positioning the frame A' relative to the base B' involves the arm formed by the eccentricity of the stem 135 relative to the shank 130. In practice, the shank 130 will be held in the chuck of a machine tool and will be gripped and turned by turning the said chuck and to the end that the mounting is shifted in the plane of movement *a*. In carrying out this form of the invention, the contact-point 11, as above described, is first positioned in the plane of movement *a* by manually holding the frame A' against rotation and by simultaneously turning the base B', after which the contact-point 11 is positioned in the plane *b* as above set forth. As shown diagrammatically in FIG. 11, rotation of the shank 130 causes lateral shifting of the stem 135 in the plane of movement *a*.

The means E' for locking the frame A' relative to the base B' involves a lock screw 160 that cooperates with the groove 132 in the stem 135. As above described in the first form of the invention, a clamping action is obtained between the bottom end 131 of the shank and top 142 of the frame A'. In the structure now under consideration the lock screw 160 has a conical nose 161 engaged with an inclined shoulder 133 on the stem 135. The shoulder 133 faces upwardly so that engagement of the nose 161 with the shoulder urges the stem downwardly to clamp the bottom end 131 of the shank onto the top 142 of the frame A'. As indicated the screw 160 is threadedly carried in the body of the frame A' and has a knurled head for manipulation.

In FIG. 9 of the drawings I have shown a dial indicator coupling or support 123 threaded to engage in a coupling body 129. The stem 127 is grooved at 128, the same as above described, and the body 129 has a dove-tailed guideway to receive a mating dove-tail 129' projecting from the body 120 of the dial indicator. The mating parts slide together and the bottom of the stem 127 is at to have bearing engagement with the tip of the body 120 when the threaded parts are tightened. The stem 127 is rotatably positioned and set by the screw 155.

In order to operate the last described form of the invention, the lock means E' is loosened so that the positioning means D'' is operable. Quick and accurate centering in the plane *a* is readily obtained by simply rotating the base B' by rotation of the supporting chuck of the machine tool. After positioning in the plane $a$ is established, the means F and G are operated separately and independently of the means D" and E' in order to position the contact-point 11 in the plane $b$.

In order to operate the indicator mounting that I provide the base B is secured in a fixed position, as for example, in the chuck Y' of a machine tool. The extension bar 100 can be employed in the manner illustrated in FIG. 1 to accommodate large diameter workpieces X, or the structure can be directly chucked as illustrated in FIGS. 2 and 3. By loosening the means E, the means D can be operatively adjusted to position the frame A relative to the base B, after which the means E is tightened to lock the indicator Z in the plane of movement $b$. By loosening the means G, the means F can be operatively adjusted to position the carrier C relative to the frame A, after which the means G is tightened to lock the indicator Z in the plane of movement $a$. It will be apparent that the contact-point 11 can be selectively positioned in either adjustment, and to the end that the accurate positioning of the indicator Z is greatly facilitated. The dial indicator is, therefore, fed into working position and is solidly locked, the parts and elements of the mounting structure being rugged and short-coupled so that the indicator is held without vibration.

Having described only the typical preferred forms and applications of my invention, I do not wish to be limited or restricted to the specific details herein set forth, but wish to reserve to myself any variation or modifications that may appear to those skilled in the art and which fall within the scope of the following claims:

Having described my invention, I claim:

1. A dial indicator mounting for individual adjustment in two planes at right angles to each other, and including, a base having a vertically disposed shank and an eccentric stem depending from the lower end of the shank, a frame rotatably carried by the stem to pivot eccentrically in one plane, and a carrier for supporting the dial indicator and shiftably carried by the frame to move in a plane normal to the first mentioned plane.

2. A dial indicator mounting for individual adjustment in two planes at right angles to each other, and including, a base having a vertically disposed shank and an eccentric stem depending from the lower end of the shank and with a groove therein, a frame rotatably carried by the stem to pivot eccentrically in one plane, means cooperating with said groove to lock the frame in the selected position, and a carrier for supporting the dial indicator and shiftably carried by the frame to move in a plane normal to the first mentioned plane.

3. A dial indicator mounting for individual adjustment in two planes at right angles to each other, and including, a base having a vertically disposed shank and an eccentric stem depending from the lower end of the shank and with a groove therein, a frame rotatably carried by the stem to pivot eccentrically in one plane, means cooperating with said groove to lock the frame in the selected position and comprising a screw operable into clamping engagement with the groove, and a carrier for supporting the dial indicator and shiftably carried by the frame to move in a plane normal to the first mentioned plane.

References Cited in the file of this patent

UNITED STATES PATENTS

| | | |
|---|---|---|
| 544,216 | Droste | Aug. 6, 1895 |
| 1,846,465 | Becker | Feb. 23, 1932 |
| 2,459,676 | Axtell | Jan. 18, 1949 |
| 2,601,965 | Scalise | July 1, 1952 |
| 2,777,207 | Welch | Jan. 15, 1957 |
| 2,867,248 | Forney | Jan. 6, 1959 |
| 2,909,351 | Pratt | Oct. 20, 1959 |
| 2,911,178 | Joffe | Nov. 3, 1959 |

FOREIGN PATENTS

| | | |
|---|---|---|
| 470,177 | France | June 9, 1914 |